(12) United States Patent
Song

(10) Patent No.: US 11,015,780 B2
(45) Date of Patent: May 25, 2021

(54) OPTICAL LENS FOR VEHICLE AND VEHICLE LAMP USING THE SAME

(71) Applicant: HYUNDAI MOBIS Co., Ltd., Seoul (KR)

(72) Inventor: Ki Ryong Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/558,949

(22) Filed: Sep. 3, 2019

(65) Prior Publication Data
US 2020/0116326 A1    Apr. 16, 2020

(30) Foreign Application Priority Data
Oct. 15, 2018    (KR) .......................... 10-2018-0122264

(51) Int. Cl.
```
F21S 43/40      (2018.01)
F21S 41/141     (2018.01)
F21S 41/275     (2018.01)
F21S 43/14      (2018.01)
F21S 43/31      (2018.01)
G02B 6/02       (2006.01)
F21V 7/00       (2006.01)
F21Y 115/10     (2016.01)
F21W 102/00     (2018.01)
F21W 103/20     (2018.01)
F21W 107/10     (2018.01)
```
(52) U.S. Cl.
CPC ............. *F21S 43/40* (2018.01); *F21S 41/141* (2018.01); *F21S 41/275* (2018.01); *F21S 43/14* (2018.01); *F21S 43/315* (2018.01); *F21V 7/0091* (2013.01); *G02B 6/02042* (2013.01); *F21W 2102/00* (2018.01); *F21W 2103/20* (2018.01); *F21W 2107/10* (2018.01); *F21Y 2115/10* (2016.08)

(58) Field of Classification Search
CPC .......... F21S 43/40; F21S 43/14; F21S 43/315; F21S 41/275; F21S 41/141; F21V 7/0091; G02B 6/02042
USPC ......................................................... 362/516
See application file for complete search history.

(56) References Cited

U.S. PATENT DOCUMENTS

| | | | |
|---|---|---|---|
| 4,367,519 A * | 1/1983 | Houghton | B63B 45/00 362/145 |
| 4,747,660 A * | 5/1988 | Nishioka | G02B 23/2469 385/116 |

(Continued)

FOREIGN PATENT DOCUMENTS

| | | |
|---|---|---|
| CN | 105765745 | 7/2016 |
| JP | 2004-198536 | 7/2004 |

(Continued)

*Primary Examiner* — Bryon T Gyllstrom
(74) *Attorney, Agent, or Firm* — H.C. Park & Associates, PLC

(57) ABSTRACT

An optical lens for a vehicle may include: a lens body; a light receiving part disposed on one side of the lens body so as to face a light source, and configured to receive light from the light source; a light emitting part disposed on the other side of the lens body so as to face a multi-core optical system, and configured to emit light having passed through the lens body toward the multi-core optical system; and a total internal reflection part formed between the light receiving part and the light emitting part, and configured to totally reflect lights incident from the light receiving part toward the light emitting part.

9 Claims, 8 Drawing Sheets

(56) References Cited

U.S. PATENT DOCUMENTS

| | | | | |
|---|---|---|---|---|
| 5,271,077 A * | 12/1993 | Brockman | ............ | G02B 6/4298 362/347 |
| 5,289,553 A * | 2/1994 | Ortiz, Jr. | ............... | G02B 6/4296 385/33 |
| 5,311,611 A * | 5/1994 | Migliaccio | ............... | G02B 3/00 385/120 |
| 5,384,881 A * | 1/1995 | Miller | .................. | G02B 6/0008 385/115 |
| 8,343,044 B2 * | 1/2013 | Shimotsu | ................. | A61B 1/07 600/182 |
| 2004/0246744 A1 * | 12/2004 | Krupa | .................. | A61B 1/0653 362/574 |
| 2008/0278712 A1 * | 11/2008 | Ilev | .................... | G01M 11/0228 356/125 |
| 2012/0020618 A1 * | 1/2012 | Erdman | ............... | G02B 6/3851 385/33 |
| 2014/0334126 A1 * | 11/2014 | Speier | ..................... | F21V 13/14 362/84 |
| 2015/0219313 A1 * | 8/2015 | Marcaly | ................ | F21V 7/0075 362/309 |
| 2017/0015901 A1 | 1/2017 | Lenef et al. | | |
| 2017/0082263 A1 | 3/2017 | Byrnes et al. | | |
| 2017/0175978 A1 * | 6/2017 | Geisler | ................ | G02B 6/0096 |

FOREIGN PATENT DOCUMENTS

| | | |
|---|---|---|
| JP | 2005-093622 | 4/2005 |
| JP | 2007-264330 | 10/2007 |
| JP | 2008-524045 | 7/2008 |
| JP | 2012-009380 | 1/2012 |
| JP | 2013-502695 | 1/2013 |
| JP | 2013-200486 | 10/2013 |
| KR | 100516819 | 9/2005 |

\* cited by examiner

OPTICAL LENS FOR VEHICLE AND VEHICLE LAMP USING THE SAME

CROSS-REFERENCE TO RELATED APPLICATION

This application claims priority from and the benefit of Korean Patent Application No. 10-2018-0122264, filed on Oct. 15, 2018, which is hereby incorporated by reference for all purposes as if set forth herein.

BACKGROUND

Field

Exemplary embodiments relate to an optical lens for a vehicle and a vehicle lamp using the same, and more particularly, to an optical lens for a vehicle, which can be applied to a multi-core optical system, and a vehicle lamp using the same.

Discussion of the Background

In general, a vehicle lamp is used to secure vision to check a target object during night operation, or used to inform another vehicle or other road users of a traveling state of an ego vehicle. Recently, various optical systems including not only a single-core optical system but also a multi-core optical system such as a light guide and optical fiber are applied to diversify and differentiate a light-on image of a rear lamp for a vehicle.

The related art of the present invention is disclosed in Korean Patent No. 10-0516819 registered on Sep. 15, 2005 and entitled "TOTAL-REFLECTOR LENS AND VEHICLE LAMP USING THEREOF".

Conventionally, research and design on optical efficiency of an optical lens applied to a vehicle lamp have been limited to the single-core optical system. Recently, although an attempt to apply various optical systems including the multi-core optical system has been made, the structure of the optical lens adapted for the single-core optical system is still applied.

Therefore, there is a need for a structure capable of solving the problem.

The above information disclosed in this Background section is only for enhancement of understanding of the background of the invention and, therefore, it may contain information that does not constitute prior art.

SUMMARY

Exemplary embodiments of the present invention provide an optical lens for a vehicle, which can stably secure illuminance uniformity of lights incident on cores of a multi-core optical system, and a vehicle lamp using the same.

Additional features of the invention will be set forth in the description which follows, and in part will be apparent from the description, or may be learned by practice of the invention.

In one embodiment, an optical lens for a vehicle may include: a lens body; a light receiving part disposed on one side of the lens body so as to face a light source, and configured to receive light from the light source; a light emitting part disposed on the other side of the lens body so as to face a multi-core optical system, and configured to emit light having passed through the lens body toward the multi-core optical system; and a total internal reflection part formed between the light receiving part and the light emitting part, and configured to totally reflect lights incident from the light receiving part toward the light emitting part.

The light receiving part may have a flat surface, the light emitting part may have a larger diameter than the light receiving part, and is formed in parallel to the light receiving part, and the total internal reflection part may have a sculptured surface that totally reflects lights incident from the light receiving part such that the lights become parallel lights propagating linearly toward the light emitting part in parallel.

The light receiving part may have the same diameter as or a larger diameter than the light source, and the light emitting part may have the same diameter as or a larger diameter than the multi-core optical system.

The total internal reflection part may have a trapezoidal cross-sectional shape.

The ratio of the distance between the light receiving part and the light emitting part to the diameter of the light receiving part may range from about 0.48 to about 2.05.

The ratio of the distance between the light receiving part and the light emitting part to the diameter of the light receiving part may range from 0.84 to 2.05, such that an illuminance difference of light emitted from the light emitting part falls within a first set value.

The distance between the light source and the light receiving part may range from 0 to about 0.5 mm, and the ratio of the distance between the light receiving part and the light emitting part to the diameter of the light receiving part may range from about 0.48 to about 1.31 such that light receiving efficiency of light incident on the light receiving part from the light source is equal to or more than a second set value.

The ratio of the distance between the light receiving part and the light emitting part to the diameter of the light receiving part may range from 0.84 to 1.31 such that the light receiving efficiency of light incident on the light receiving part from the light source is equal to or more than the second set value and the illuminance difference of light emitted from the light emitting part falls within the first set value.

In another embodiment, a vehicle lamp may include: a light source; an optical lens including: a light receiving part disposed so as to face the light source and configured to receive light from the light source; a light emitting part configured to emit light; and a total internal reflection part formed between the light receiving part and the light emitting part, and configured to totally reflect light incident from the light receiving part toward the light emitting part, wherein the ratio of a distance between the light receiving part and the light emitting part to a diameter of the light receiving part ranges from about 0.48 to about 2.05; and a multi-core optical system disposed so as to face the light emitting part, and having a plurality of optical systems configured to receive the light emitted from the light emitting part.

The multi-core optical system may have a structure in which a plurality of cores are concentrated in a bundle shape, and light incidence parts facing the optical lens are arranged to form a continuous surface.

The ratio of the distance between the light receiving part and the light emitting part to the diameter of the light receiving part may range from 0.84 to 2.05, such that an illuminance difference of light emitted from the light emitting part falls within a first set value.

The distance between the light source and the light receiving part may range from 0 to about 0.5 mm, and the ratio of the distance between the light receiving part and the light emitting part to the diameter of the light receiving part may range from about 0.48 to about 1.31 such that light receiving efficiency of light incident on the light receiving part from the light source is equal to or more than a second set value.

In the optical lens for a vehicle and the vehicle lamp using the same in accordance with the embodiment of the present invention, the diameter of the light receiving part, and the distance between the light receiving part and the light emitting part may be recognized as main factors having an influence on the illuminance uniformity and applied to the multi-core optical system, and the design structure in which the ratio is optimized to the range of about 0.48 to about 2.05 may be provided.

Therefore, when the present invention is applied to the multi-core optical system, the optical efficiency such as the illuminance uniformity of light incident on each of the cores can be stably and reliably secured. Thus, the brightness of each of the cores constituting the multi-core optical system may be equally implemented.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
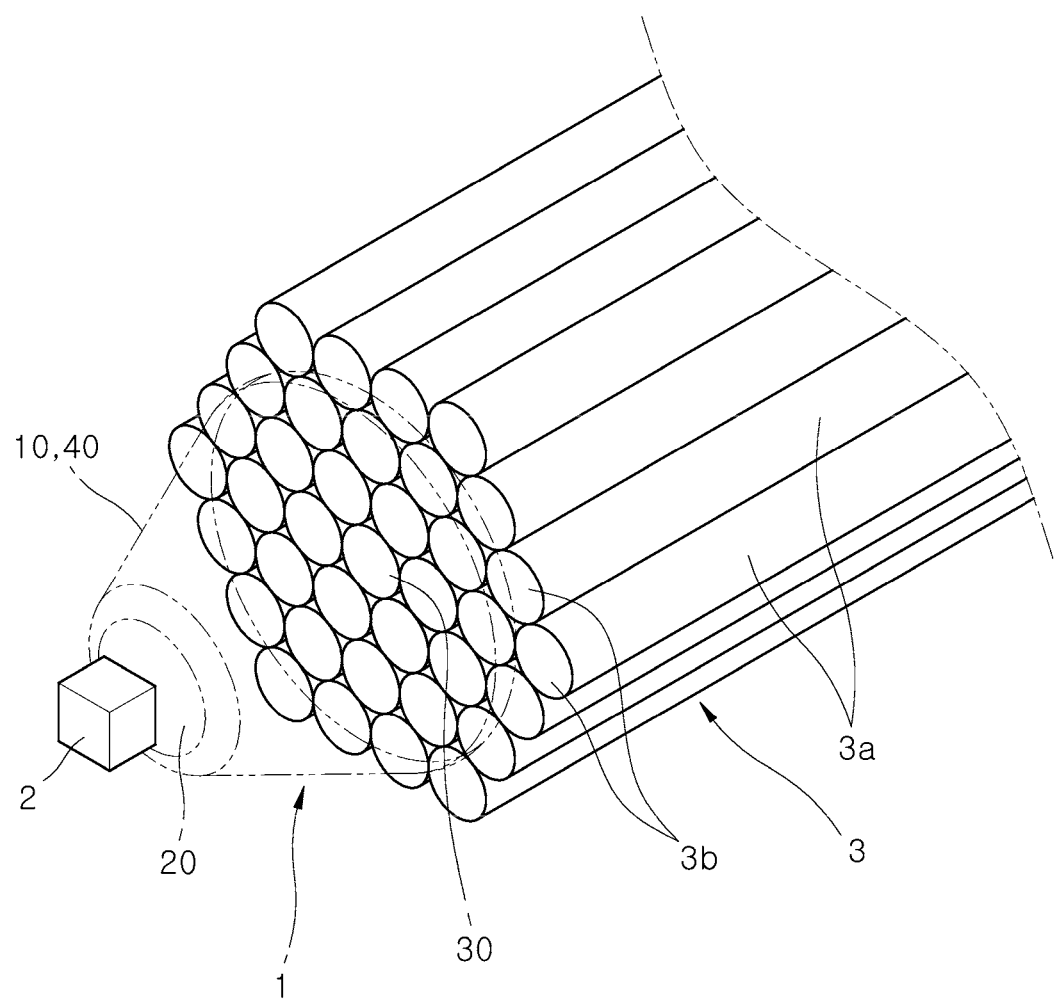
FIG. 1 is a perspective view schematically illustrating a vehicle lamp in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an optical lens for a vehicle and a vehicle lamp using the same in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a perspective view schematically illustrating a vehicle lamp in accordance with an embodiment of the present invention.

Referring to FIG. 1, the vehicle lamp in accordance with the embodiment of the present invention may include a light source 2, an optical lens 1 and a multi-core optical system 3.

Examples of the light source 2 may include an LED and the like. The multi-core optical system 3 may have a structure in which a plurality of cores 3*a* are concentrated in a bundle shape, and a light guide, optical fiber and the like may be applied as the multi-core optical system 3. One side of the multi-core optical system 3, facing the optical lens 1, may have a structure in which light incidence parts 3b of the respective cores 3a are densely arranged to form a continuous surface.

The optical lens 1 may be disposed between the light source 2 and the multi-core optical system 3. The optical lens 1 and the light source 2 may be contacted with each other or separated from each other by 0.5 mm or less, in order to minimize a loss of light emitted from the light source 2 while the light is incident on the optical lens 1. The optical lens 1 and the multi-core optical system 3 may also be contacted with each other or separated from each other by 0.5 mm or less, in order to minimize a loss of light emitted from the optical lens 1 while the light is incident on the multi-core optical system 3.

Figure 2:
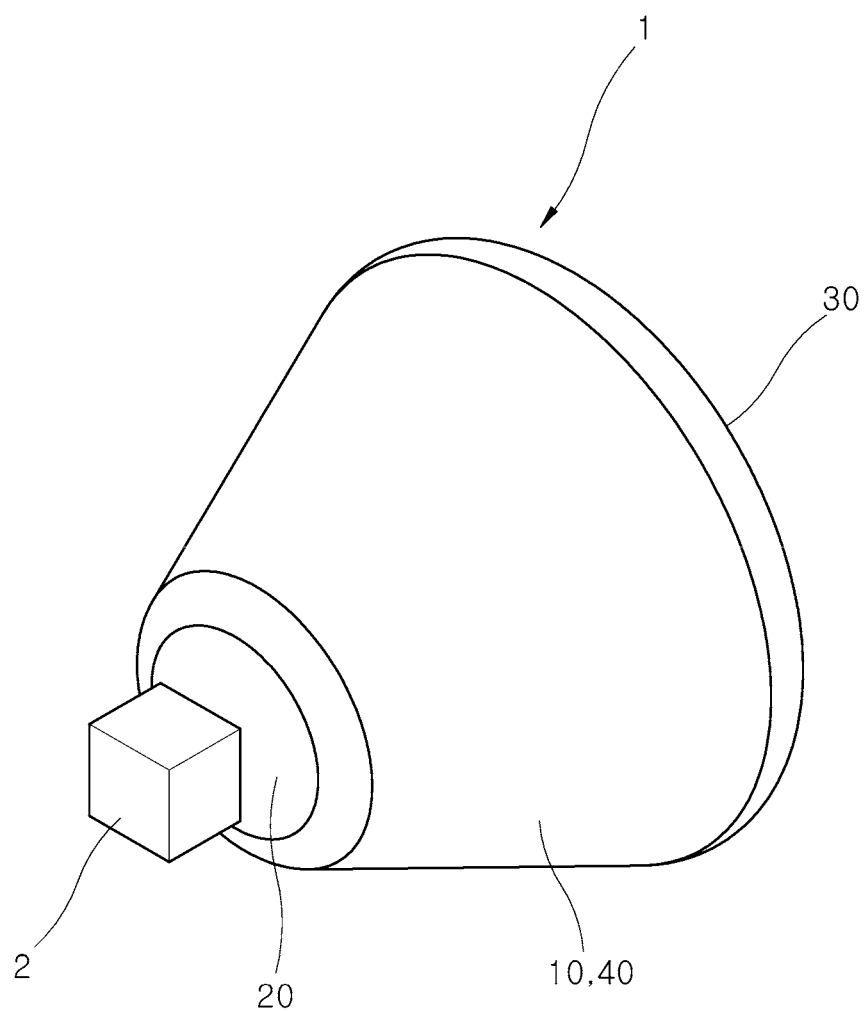
FIG. 2 is a perspective view schematically illustrating an optical lens for a vehicle in accordance with an embodiment of the present invention.
Figure 3:
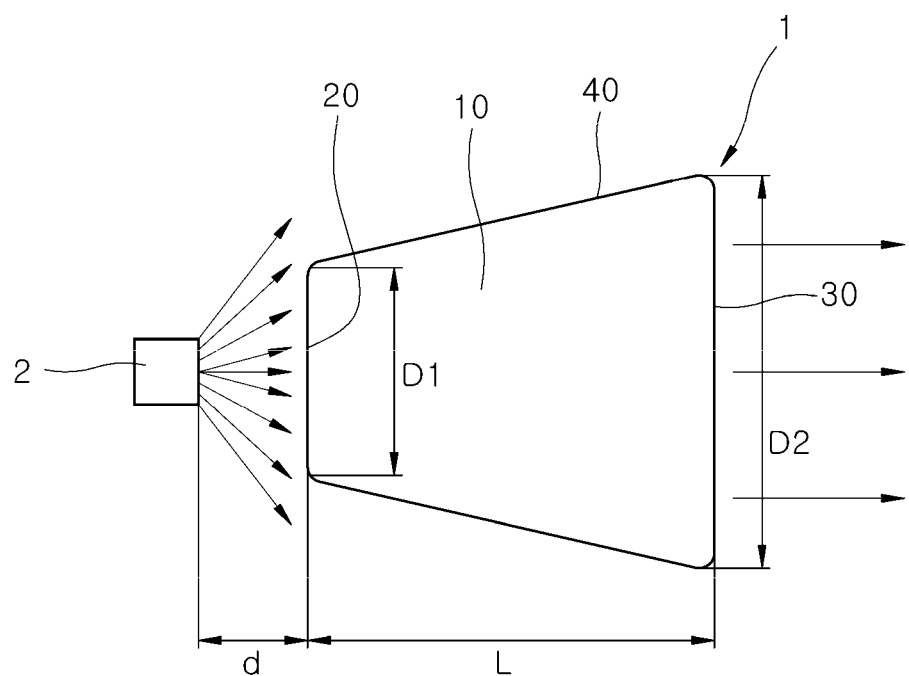
FIG. 3 is a longitudinal cross-sectional view of FIG. 2.

FIG. 2 is a perspective view schematically illustrating an optical lens for a vehicle in accordance with an embodiment of the present invention, and FIG. 3 is a longitudinal cross-sectional view of FIG. 2.

Referring to FIGS. 2 and 3, the optical lens 1 in accordance with the embodiment of the present invention may include a lens body 10, a light receiving part 20, a light emitting part 30 and a total internal reflection part 40.

The lens body 10 may be formed of a medium denser than the air, such that total internal reflection of light occurs. The light receiving part 20 may be disposed on one side of the lens body 10 so as to face the light source 2, while forming a flat surface. In FIG. 3, the light receiving part 20 may be disposed on the same horizontal line as the light source 2, and have a flat surface in a vertical direction, i.e. a vertical surface.

Light irradiated from the light source 2 may be incident on the inside of the lens body 10 through the light receiving part 20. The light receiving part 20 may have the same diameter as or a larger diameter than the light source 2, in order to minimize a loss of light emitted from the light source 2 while the light propagates toward the light receiving part 20 so as to be incident on the light receiving part 20.

The light emitting part 30 may have a larger diameter than the light receiving part 20, and be formed on the other side of the lens body 10 in parallel to the light receiving part 20. The light having passed through the lens body 10 may be incident on the multi-core optical system 3 through the light emitting part 30. The light emitting part 30 may have a diameter D2 that is decided according to the diameters and number of the cores 3a constituting the multi-core optical system 3, i.e. the diameter of the multi-core optical system 3.

More specifically, the diameter D2 of the light emitting part 30 may be decided in consideration of spatial efficiency and weight in such a range that the diameter D2 is equal to or larger than the diameter of the multi-core optical system 3, in order to make light incident on all of the cores 3a. In the present embodiment, the sizes of the light receiving part 20 and the light emitting part 30 are expressed as 'diameter', but this is only an example for convenience of description. The shapes of the light receiving part 20 and the light emitting part 30 may not be limited to a circle, but have polygonal shapes such as square, rectangle and triangle, depending on the design condition, the specification and the like.

The total internal reflection part 40 may serve to totally reflect light incident from the light receiving part 20 toward the light emitting part 30, and be formed between the light receiving part 20 and the light emitting part 30 while having a trapezoidal cross-sectional shape. The total internal reflection part 40 may be inclined and extended from the light receiving part 20 to the light emitting part 30 as a whole, and partially have a sculptured surface through which lights incident at various angles from the light receiving part 20 are totally reflected so as to become parallel lights propagating linearly toward the light emitting part 30 in parallel to one another.

The sculptured surface may have various shapes and structures depending on the medium of the lens body 10 and the incident angles of lights, and is not limited to specific structures and shapes including the publicly-known arts, as long as the sculptured surface can totally reflect lights incident at various angles from the light receiving part 20 such that the lights become parallel lights propagating linearly toward the light emitting part 30 in parallel to one another. Thus, the detailed descriptions thereof will be omitted herein.

Figure 4:
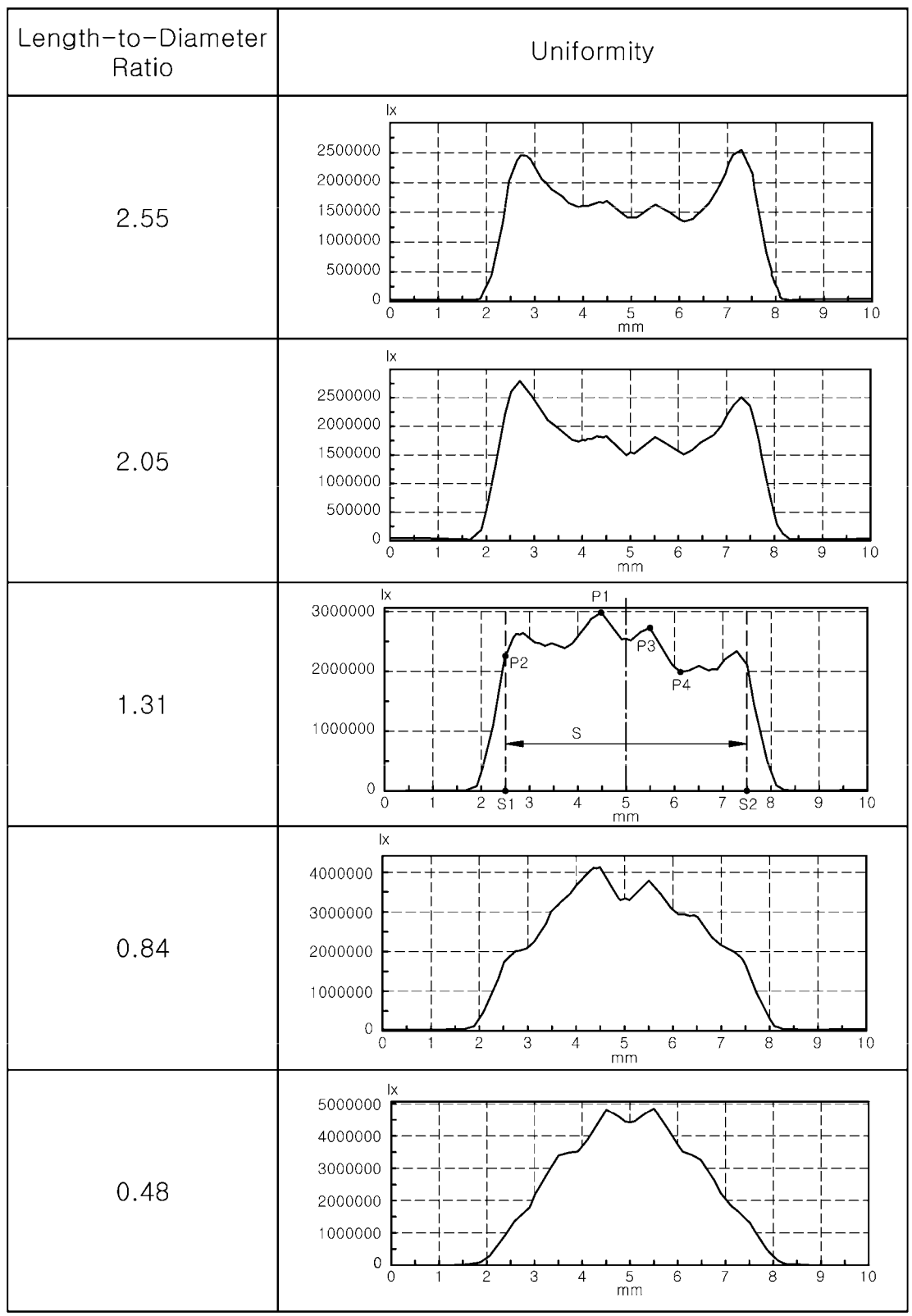
FIG. 4 is a table illustrating light distribution graphs for comparing uniformity depending on the ratio of a distance (length) between the light receiving part and a light emitting part to the diameter of a light receiving part in the optical lens for a vehicle in accordance with the embodiment of the present invention.

FIG. 4 is a table illustrating light distribution graphs for comparing uniformity depending on the ratio of a distance (length) between the light receiving part and the light emitting part to the diameter of the light receiving part in the optical lens for a vehicle in accordance with the embodiment of the present invention.

The table of FIG. 4 includes two fields for the ratio of length to diameter and the uniformity. In FIG. 4, the ratio of length to diameter may indicate the ratio of the distance (lens length L) between the light receiving part 20 and the light emitting part 30 to a diameter D1 of the light receiving part 20. At this time, an LED having a light emission area of 1 mm×1 mm may be applied as the light source 2.

The uniformity may indicate illuminance lx depending on a horizontal diameter position (mm) of the light emitting part 30. The center of the light emitting part 30 on the graph may correspond to a position of 5 mm, and each of the left and right sides of the graph may correspond to a distance of 5 mm from the center. That is, the graph illustrates a range of 0 to 10 mm. At this time, the light emitting part 30 may have a width of ±3.5 mm from the center, i.e. a diameter of 7 mm.

FIG. 4 shows that, when the ratio of the distance L between the light receiving part 20 and the light emitting part 30 to the diameter D1 of the light receiving part 20 is 1.31 in a section S between two points S1 and S2 positioned inward at a preset distance from both horizontal ends of the light emitting part 30, the smallest illuminance difference, that is, the most excellent uniformity is obtained.

In order to quantify the illuminance uniformity, a range from both horizontal ends of the light emitting part 30, where the light intensity is the lowest, to an inward position corresponding to a preset distance of 1 mm, for example, toward the center may be applied as a valid range of the illuminance measurement and calculation. That is, the uniformity may be determined by comparing differences between the maximum illuminance and the minimum illuminance in the section S between the two points S1 and S2 corresponding to a distance of ±2.5 mm from the center of the light emitting part 30 in the side-to-side direction. More specifically, a difference between a maximum illuminance P1 and a minimum illuminance P2 on the left side of the center of the light emitting part 30 and a difference between a maximum illuminance P3 and a minimum illuminance P4 on the right side of the center of the light emitting part 30 may be averaged and set to the uniformity.

When the ratio of the distance L between the light receiving part 20 and the light emitting part 30 to the diameter D1 of the light receiving part 20 is 1.31, the maximum illuminance P1 and the minimum illuminance P2 on the left side are 3,000,000 lx and 2,300,000 lx, respectively, and the maximum illuminance P3 and the minimum illuminance P4 on the right side are 2,750,000 lx and 2,000,000 lx, respectively. When the uniformity is quantified into 725,000 lx [={(3,000,000−2,300,000=700,000)+(2,750,000−2,000,000=750,000)}/2)], it may indicate that the uniformity has the lowest value, compared to the other cases in which the ratios of the distance L between the light receiving part 20 and the light emitting part 30 to the diameter D1 of the light receiving part 20 have different values. This may indicate that the smallest illuminance difference, that is, the most excellent uniformity is obtained.

Such experiment, data derivation, calculation and comparison processes may show that the uniformity of illuminance in the light emitting part 30 is the most excellent when the ratio of the distance L between the light receiving part 20 and the light emitting part 30 to the diameter D1 of the light receiving part 20 is 1.31. When the ratio of the distance L between the light receiving part 20 and the light emitting part 30 to the diameter D1 of the light receiving part 20 is applied to the optical lens 1 for a vehicle and the vehicle lamp, a range of about 0.48 to about 2.05 may be applied as the ratio in consideration of error ranges of manufacturing, assembling and installation processes of the optical lens 1.

When the ratio of the distance L between the light receiving part 20 and the light emitting part 30 to the diameter D1 of the light receiving part 20 is 1.31, the illuminance difference in the light emitting part 30 may be calculated as 725,000 lx. However, when a range in which an illuminance difference of light emitted from the light emitting part 30 falls within a first set value of 1,000,000 lx, for example, is added, the ratio of the distance L between the light receiving part 20 and the light emitting part 30 to the diameter D1 of the light receiving part 20 may be further reduced to a range of 0.84 to 2.05.

The first set value may be changed to various values depending on the specification, main functions and installation conditions of the vehicle lamp, the medium of the optical lens 1 and the structure and performance of the light source 2. Although various values are variably applied as the first set value, the illuminance uniformity may be more stably secured for the entire light emitting part 30 when the ratio of the distance L between the light receiving part 20 and the light emitting part 30 to the diameter D1 of the light receiving part 20 is further reduced to the range of 0.84 to 2.05. Thus, even though manufacturing, assembling or installation errors among products occur during mass production, the reliability of the illuminance uniformity can be secured.

This may indicate that light emitted from the one light source 2 is reliably incident on the plurality of cores 3a constituting the multi-core optical system 3 at more uniform illuminance, compared to the case in which the ratio of the distance L between the light receiving part 20 and the light emitting part 30 to the diameter D1 of the light receiving part 20 has a different range.

Figure 5:
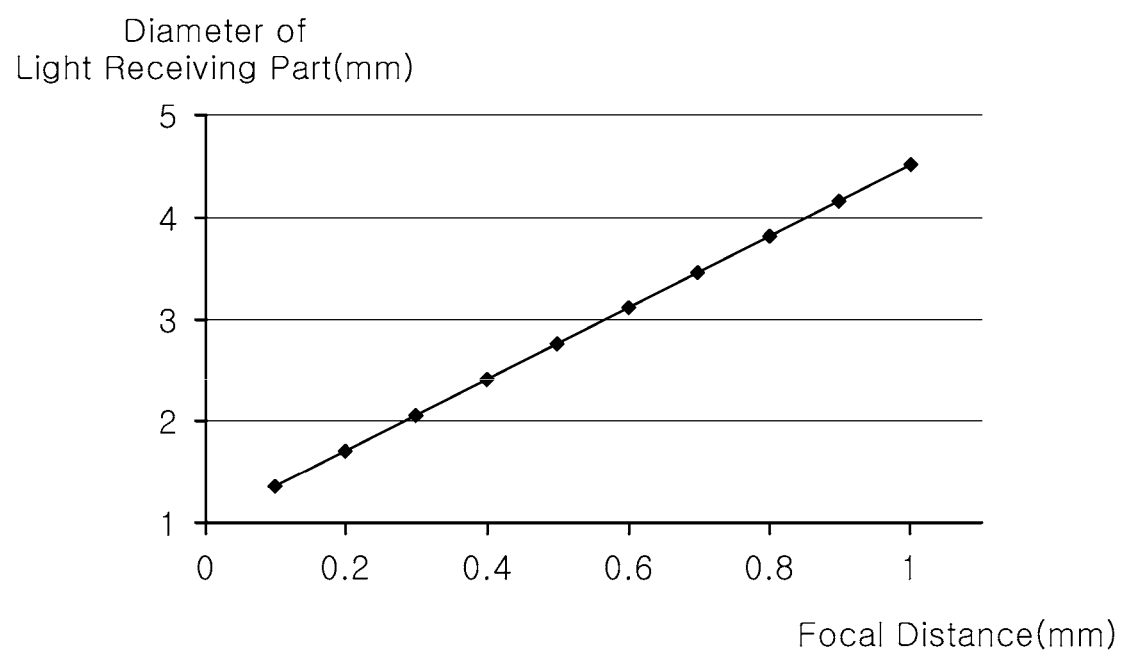
FIG. 5 is a graph illustrating a result obtained by performing an experiment on the relationship between the diameter of the light receiving part and a distance between a light source and the light receiving part when implementing the same light receiving efficiency.
Figure 6:
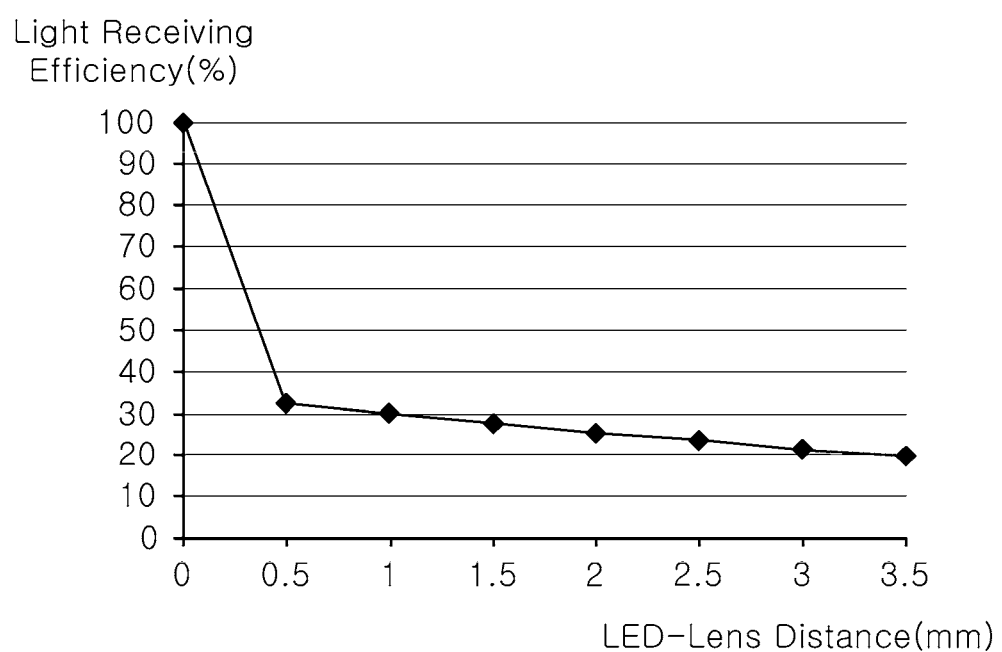
FIG. 6 is a graph illustrating a result obtained by performing an experiment on light receiving efficiency depending on the distance between the light source and the light receiving part.
Figure 7:
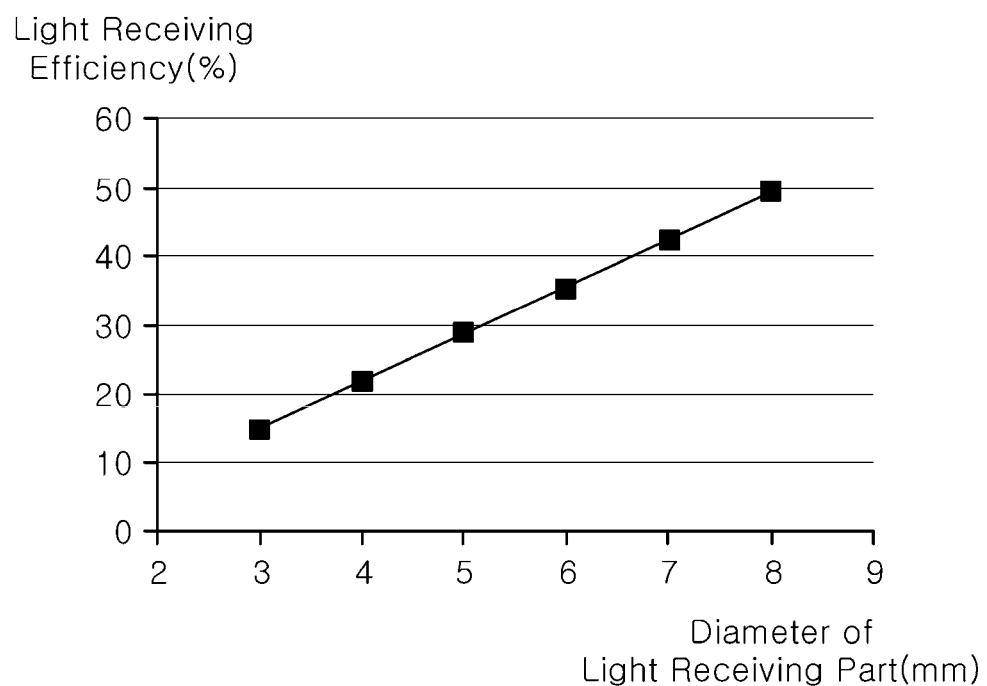
FIG. 7 is a graph illustrating a result obtained by performing an experiment on light receiving efficiency depending on the diameter of the light receiving part.

FIG. 5 is a graph illustrating a result obtained by performing an experiment on the relationship between the diameter of the light receiving part and the distance between the light source and the light receiving part when implementing the same light receiving efficiency, FIG. 6 is a graph illustrating a result obtained by performing an experiment on light receiving efficiency depending on the distance between the light source and the light receiving part, and FIG. 7 is a graph illustrating a result obtained by performing an experiment on light receiving efficiency depending on the diameter of the light receiving part.

The graph of FIG. 5 shows that the same light receiving efficiency can be implemented only when the diameter D1 of the light receiving part 20 linearly increases as the distance (focal distance) L between the light receiving part 20 and the light emitting part 30 is increased. The light receiving efficiency may indicate how much light emitted from the light source 2 is incident on the light receiving part 20 without a loss.

The graph of FIG. 6 shows that, when the light receiving part 20 has the constant diameter D1, the light receiving efficiency increases as the distance d between the light source 2 and the light receiving part 20 is decreased. Furthermore, the graph of FIG. 6 shows that a light receiving efficiency of 30% or more can be implemented only when the distance between the light source 2 and the light receiving part 20 is set to 0.5 mm or less. Therefore, the distance d between the light source 2 and the light receiving part 20 may be set to about 0.5 mm or less. That is, the light receiving part 20 may be contacted with the light source 2, or disposed at a distance of about 0.5 mm or less from the light source 2. At this time, an LED having a light emission area of 1 mm×1 mm may be applied as the light source 2.

The graph of FIG. 7 shows that, when the distance d between the light source 2 and the light receiving part 20 is constant, the light receiving efficiency increases as the diameter of the light receiving part 20 is increased. The contents of the graphs illustrated in FIGS. 5 to 7 show that the distance L between the light receiving part 20 and the light emitting part 30 and the diameter D1 of the light receiving part 20 are important factors to have an influence on the light receiving efficiency.

The graph of FIG. 5 shows that the distance L between the light receiving part 20 and the light emitting part 30 is linearly proportional to the diameter D1 of the light receiving part 20, which means that the distance L between the light receiving part 20 and the light emitting part 30 and the diameter D1 of the light receiving part 20 may be adjusted and applied in connection with each other.

Figure 8:
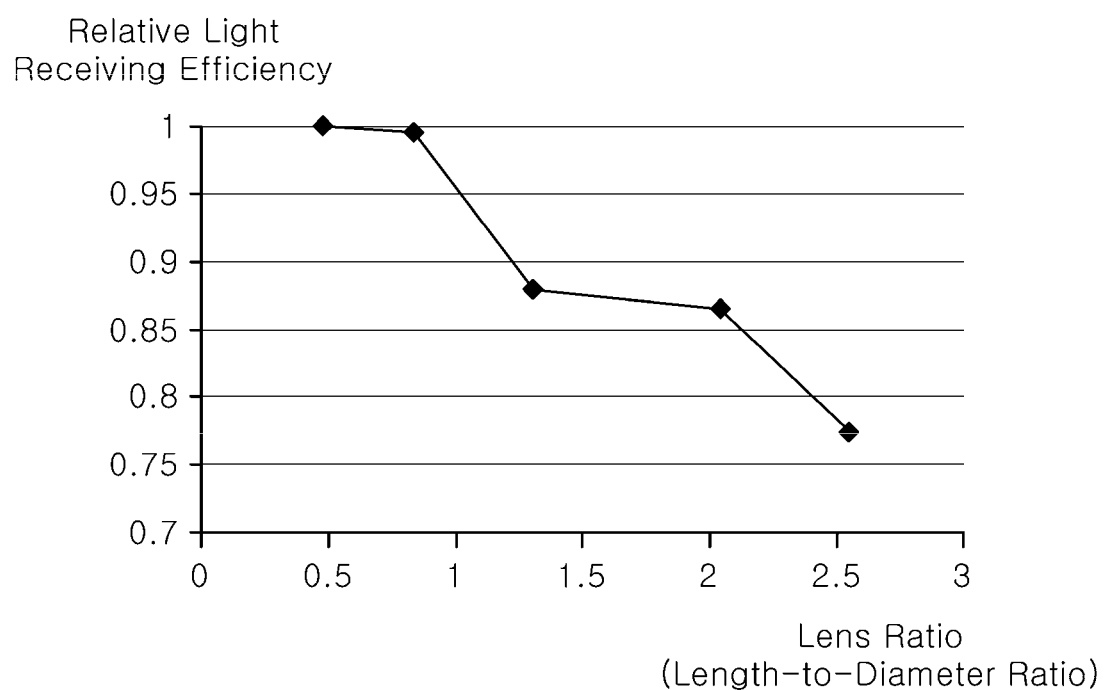
FIG. 8 is a graph illustrating a result obtained by performing an experiment on light receiving efficiency depending on the ratio of the distance (length) between the light receiving part and the light emitting part to the diameter of the light receiving part.

FIG. 8 is a graph illustrating a result obtained by performing an experiment on light receiving efficiency depending on the ratio of the distance (length) between the light receiving part and the light emitting part to the diameter of the light receiving part.

The graph of FIG. 8 shows that, when the ratio of the distance L between the light receiving part 20 and the light emitting part 30 to the diameter D1 of the light receiving part 20 is about 0.48, the light receiving efficiency is the highest (relative light receiving efficiency of 1). Furthermore, the graph of FIG. 8 shows that the light receiving efficiency gradually decreases as the ratio of the distance L between the light receiving part 20 and the light emitting part 30 to the diameter D1 of the light receiving part 20 becomes higher than 0.48.

As described above, the table of FIG. 4 shows that, when the ratio of the distance L between the light receiving part 20 and the light emitting part 30 to the diameter D1 of the light receiving part 20 is 1.31, the uniformity of illuminance in the light emitting part 30 is the best. Furthermore, when the ratio of the distance L between the light receiving part 20 and the light emitting part 30 to the diameter D1 of the light receiving part 20 is applied to the optical lens 1 for a vehicle and the vehicle lamp, a range of about 0.48 to about 2.05 may be applied as the ratio in consideration of error ranges of the manufacturing, assembling and installation processes of the optical lens 1.

When the ratio of the distance L between the light receiving part 20 and the light emitting part 30 to the diameter D1 of the light receiving part 20 is about 0.48, the light receiving efficiency of light incident on the light receiving part 20 from the light source 2 may be maximized. However, when a range in which the light receiving efficiency is equal to or more than a second set value, for example, a range in which the relative light receiving efficiency in the graph of FIG. 8 is equal to or more than 0.87 is added, the ratio of the distance L between the light receiving part 20 and the light emitting part 30 to the diameter D1 of the light receiving part 20 may be further reduced to a range of about 0.48 to about 1.31.

The second set value may be changed to various values depending on the specification, main functions and installation conditions of the vehicle lamp, the medium of the optical lens 1 and the structure and performance of the light source 2. Although various values are variably applied as the second set value, the light receiving efficiency of the light receiving part 20 may be more stably secured when the ratio of the distance L between the light receiving part 20 and the light emitting part 30 to the diameter D1 of the light receiving part 20 is further reduced to the range of about 0.48 to about 1.31. Therefore, even though manufacturing, assembling or installation errors among products occur during mass production, the reliability of the light receiving efficiency can be secured.

This may indicate that light emitted from the one light source 2 is efficiently incident on the plurality of cores 3a constituting the multi-core optical system 3 while a light loss is minimized, compared to the case in which the ratio of the distance L between the light receiving part 20 and the light emitting part 30 to the diameter D1 of the light receiving part 20 has a different range.

The present invention may be summarized as follows. When the ratio of the distance L between the light receiving part 20 and the light emitting part 30 to the diameter D1 of the light receiving part 20 is 1.31, the uniformity of illuminance in the light emitting part 30 is the best. In consideration of error ranges of the manufacturing, assembling and installation processes of the optical lens 1, the range of about 0.48 to about 2.05 may be applied as the ratio of the distance L between the light receiving part 20 and the light emitting part 30 to the diameter D1 of the light receiving part 20.

Furthermore, when the ratio of the distance L between the light receiving part 20 and the light emitting part 30 to the diameter D1 of the light receiving part 20 is further reduced to the range of 0.84 to 2.05 (hereafter, referred to as "uniformity securing range") from the above-described range, the uniformity of illuminance for the entire light emitting part 30 can be more stably secured.

Furthermore, when the ratio of the distance L between the light receiving part 20 and the light emitting part 30 to the diameter D1 of the light receiving part 20 is further reduced to the range of about 0.48 to about 1.31 (hereafter, referred to as "light receiving efficiency securing range") from the above-described range, the light receiving efficiency of the light receiving part 20 can be more stably secured.

In addition, when a range in which the ratio of the distance L between the light receiving part 20 and the light emitting part 30 to the diameter D1 of the light receiving part 20 ranges from 0.84 to 1.31, which the uniformity securing range and the light receiving efficiency securing range intersect each other is applied to the optical lens 1, the illuminance uniformity of the light emitting part 30 and the light receiving efficiency of the light receiving part 20 can be optimized.

In the optical lens 1 for a vehicle and the vehicle lamp using the same in accordance with the embodiment of the present invention, the diameter D1 of the light receiving part 20 to the distance L between the light receiving part 20 and the light emitting part 30 may be recognized as main factors having an influence on the illuminance uniformity and applied to the multi-core optical system 3, and the design structure in which the ratio is optimized to the range of about 0.48 to about 2.05 may be provided.

Therefore, when the ratio is applied to the multi-core optical system 3, the optical efficiency such as the illuminance uniformity of light incident on each of the cores 3a can be stably and reliably secured. Thus, the brightness of each of the cores 3a constituting the multi-core optical system 3 may be equally implemented.

Although preferred embodiments of the invention have been disclosed for illustrative purposes, those skilled in the art will appreciate that various modifications, additions and substitutions are possible, without departing from the scope and spirit of the invention.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An optical lens for a vehicle, consisting of:
    a lens body;
    a light receiving part disposed on one side of the lens body to directly face a light source spaced therefrom, the light receiving part being configured to receive light from the light source, wherein the light receiving part has a flat surface;
    a light emitting part disposed on another side of the lens body to face a multi-core optical system, the light emitting part being configured to emit light having passed through the lens body toward the multi-core optical system, wherein the light emitting part has a larger diameter than the light receiving part and is formed in parallel to the light receiving part; and
    a total internal reflection part formed between the light receiving part and the light emitting part, the total internal reflection part having a trapezoidal cross-sectional shape along a central axis and a circular cross-sectional shape perpendicular to the central axis, wherein the total internal reflection part has a sculptured surface configured to totally reflect the light incident from the light receiving part toward the light emitting part and cause the light output via the light emitting part to be collimated;
    wherein a ratio of a distance between the light receiving part and the light emitting part to a diameter of the light receiving part ranges from about 0.48 to about 2.05 for the illuminance uniformity of light incident on each of the cores constituting the multi-core optical system.

2. The optical lens of claim 1, wherein:
    a diameter of the light receiving part is greater than or equal to a diameter of the light source; and
    the diameter of the light emitting part is greater than or equal to a diameter of the multi-core optical system.

3. The optical lens of claim 1, wherein a ratio of a distance between the light receiving part and the light emitting part to a diameter of the light receiving part ranges from about 0.84 to about 2.05 such that an illuminance difference of light emitted from the light emitting part falls within a first set value.

4. The optical lens of claim 1, wherein:
a distance between the light source and the light receiving part ranges from 0 mm to about 0.5 mm; and
a ratio of a distance between the light receiving part and the light emitting part to a diameter of the light receiving part ranges from about 0.48 to about 1.31 such that light receiving efficiency of light incident on the light receiving part from the light source is greater than or equal to a second set value.

5. The optical lens of claim 4, wherein the ratio of the distance between the light receiving part and the light emitting part to the diameter of the light receiving part ranges from about 0.84 to about 1.31 such that the light receiving efficiency of light incident on the light receiving part from the light source is greater than or equal to the second set value and an illuminance difference of light emitted from the light emitting part falls within a first set value.

6. A vehicle lamp consisting of:
a light source configured to emit light;
an optical lens consisting of:
    a light receiving part facing the light source and configured to receive light emitted from the light source;
    a light emitting part configured to output light; and
    a total internal reflection part formed between the light receiving part and the light emitting part, the total internal reflection part having a trapezoidal cross-sectional shape along a central axis, a circular cross-sectional shape perpendicular to the central axis, and a sculptured surface configured to totally reflect light incident from the light receiving part toward the light emitting part such that the light output via the light emitting part is collimated; and
a multi-core optical system facing the light emitting part, the multi-core optical system comprising a plurality of optical systems configured to receive the collimated light output from the light emitting part,
wherein a ratio of a distance between the light receiving part and the light emitting part to a diameter of the light receiving part ranges from about 0.18 to about 2.05 for the illuminance uniformity of light incident on each of the cores constituting the multi-core optical system.

7. The vehicle lamp of claim 6, wherein the multi-core optical system has a structure in which a plurality of cores are concentrated in a bundle shape, and light incidence parts facing the optical lens are arranged to form a continuous surface.

8. The vehicle lamp of claim 6, wherein the ratio of the distance between the light receiving part and the light emitting part to the diameter of the light receiving part ranges from about 0.84 to about 2.05 such that an illuminance difference of light emitted from the light emitting part falls within a first set value.

9. The vehicle lamp of claim 6, wherein:
a distance between the light source and the light receiving part ranges from 0 mm to about 0.5 mm; and
the ratio of the distance between the light receiving part and the light emitting part to the diameter of the light receiving part ranges from about 0.48 to about 1.31 such that light receiving efficiency of light incident on the light receiving part from the light source is greater than or equal to a second set value.

* * * * *